Figure 1:
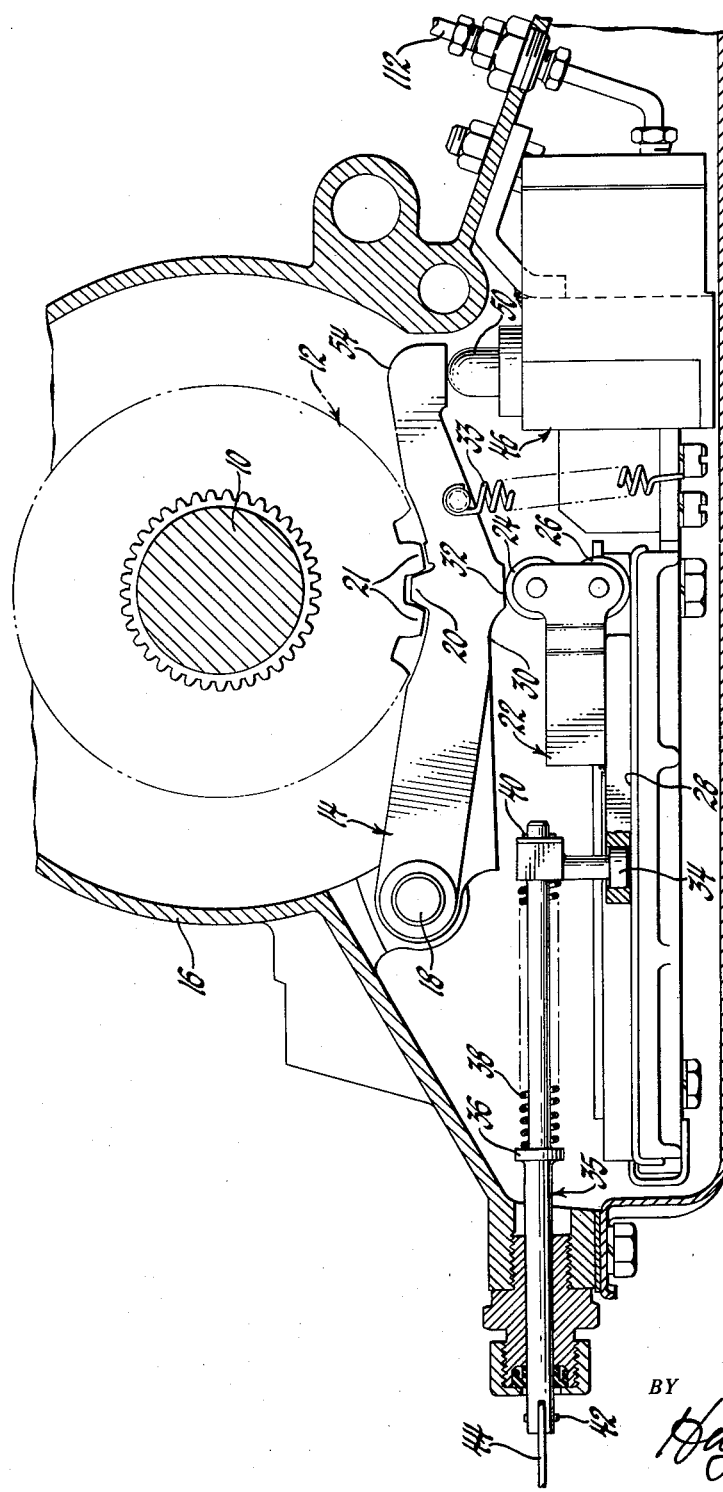

July 10, 1962

O. K. KELLEY 3,043,403

BRAKE MECHANISM

Filed Oct. 10, 1958

2 Sheets-Sheet 1

INVENTOR.
Oliver K. Kelley
BY
Hugh R. Fisher
ATTORNEY

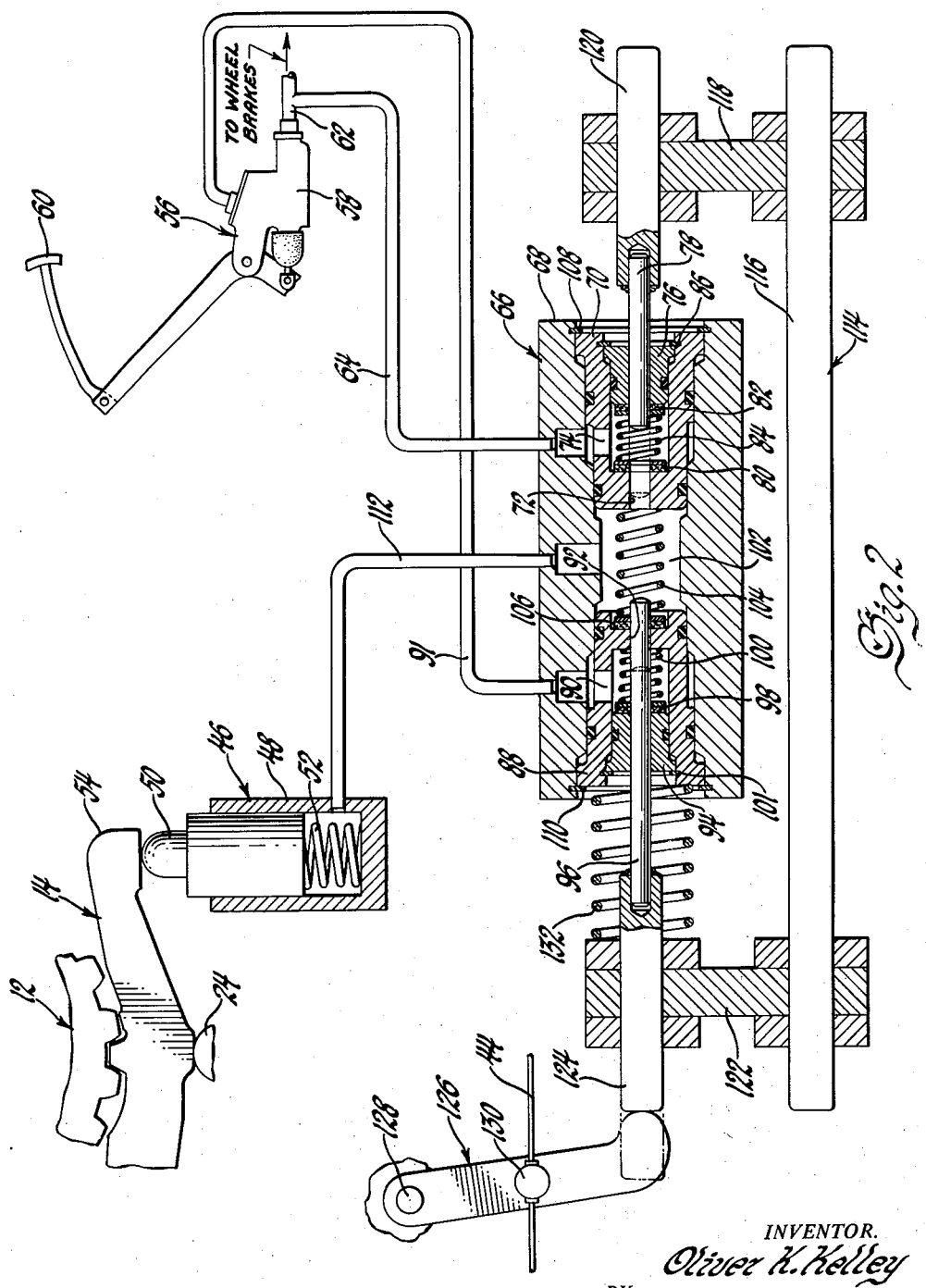

United States Patent Office 3,043,403
Patented July 10, 1962

3,043,403
BRAKE MECHANISM
Oliver K. Kelley, Bloomfield Hills, Mich., assignor to General Motors Corporation, Detroit, Mich., a corporation of Delaware
Filed Oct. 10, 1958, Ser. No. 766,543
12 Claims. (Cl. 188—69)

This invention relates generally to brake mechanisms and particularly to improvements in parking brake mechanisms for motor vehicles.

Whenever a positive brake is employed, such as the kind with interengaging teeth, there is always the problem of disengagement under load, especially when the interengaged teeth are designed so as to tend not to separate under load. A specific example of the problem occurs with the positive type parking brake mechanism commonly employed in automatic transmissions for motor vehicles. When the vehicle is stationed on a hill, the transmission parking brake is loaded so that the forces resisting disengagement are so great that they interfere with easy disengagement. Consequently, to design for this extreme condition, leverages must be increased through the agency of links and levers and dimensional tolerances must be carefully maintained to insure that the parking brake can always be easily disengaged. With critical tolerances and the need for maximum leverages, of course, the cost per unit is increased.

Accordingly, the invention contemplates a brake mechanism wherein any load thereon may be removed to facilitate easy disengagement.

Specifically, the invention affords the foregoing brake mechanism with an auxiliary arrangement for relieving the load on an actuator for the brake mechanism so that the actuator may be easily operated in producing a disengagement of the brake mechanism.

More specifically, the invention seeks to provide a vehicle transmission parking brake mechanism which includes an expansible chamber motor and a control valve mechanism therefor, the latter being in communication with the fluid pressure system for the vehicle wheel brakes. After an actuator for the brake mechanism is moved to a restraining position, holding the brake engaged, the control valve mechanism will cause, when the wheel brakes are operated, fluid pressure from the wheel brake system to be delivered to the expansible chamber motor and relieve the actuator of the load thereon so as to enable easy removal of the actuator from the restraining position.

The foregoing and other objects and advantages of the invention will be apparent from the following description and the accompanying drawings, in which:

FIGURE 1 is a sectional view through a portion of a transmission showing a parking brake mechanism incorporating the principles of the invention; and FIGURE 2 is a schematic illustration of a fluid control system for operating a servo motor which aids in disengaging the parking brake mechanism.

Referring first to FIGURE 1, the numeral 10 denotes a transmission output shaft which may be drive connected to the vehicle wheels in a well known manner. Attached to the output shaft 10 is a locking gear 12, the rotation of which is prevented by a locking element, such as the pawl viewed generally at 14. Pawl 14 is pivoted to the transmission casing 16 at 18 and is formed with a tooth 20 which interengages with teeth 21 on the locking gear 12.

Pivotal movement of the pawl 14 is generated by an actuator, shown generally at 22, which has journaled thereon, a pair of cam rollers 24 and 26 in rolling contact with each other. Cam roller 26 travels along a supporting abutment 28 provided along the transmission casing 16 while the roller 24 is engageable with a cam follower surface 30 on the pawl 14. Hence, when the actuator 22 is moved to the right and to the restraining position depicted, the pawl 14 will be moved to the engaged position in which the upper roller 24 bears against a substantially flat portion 32 of the cam follower surface 30. This flat portion 32 is substantially perpendicular to the radial line from the rotational axis of shaft 10 through the rotational axes of the rollers 24 and 26 so that there is no component of force from the pawl tending to move the rollers out of the restraining position and the pawl 14 is positively prevented from disengaging movement. Additionally, with this arrangement there is no force on the roller axes. When the actuator 22 is shifted to the left from the restraining position, a spring 33 becomes effective to pull the pawl 14 downwardly until the tooth 20 disengages from the mating teeth 21 on the locking gear 12.

The actuator 22 at the left end, as viewed in FIGURE 1, carries therewith a pin 34 which at the upper part slidably receives a shiftable rod 35. Shiftable rod 35, somewhat intermediate the ends thereof, is provided with a shoulder 36 against which abuts an end of a spring 38 surrounding the rod 35. The opposite end of the spring 38 is in engagement with the pin 34. Preferably, spring 38 is preloaded and will urge the rod 35 to the position demonstrated which is the limit of its leftward movement permitted by a retainer 40 secured to the end of the rod 35. The end of the rod 35 opposite the end with the retainer 40 is pinned at 42 to the end of a cable 44 which is then joined to an appropriate driver operated control, not shown, e.g., the conventional transmission selector lever.

When the transmission selector lever is moved to a specific setting, e.g., the Park position, the movement thereof is transferred through cable 44 to the shiftable rod 35, and then by spring 38 to the pin 34 and to the actuator 22. If the tooth 20 on the pawl 14 and the teeth 21 on the locking gear 12 are misaligned so that they cannot mesh the spring 38 will be compressed as the selector lever is moved to the Park position, although the actuator 22 is prevented from further movement. Then, as soon as the output shaft 10 is revolved to facilitate engagement of the pawl tooth 20 and the locking gear teeth 21, the spring 38 will force the actuator 22 to the FIGURE 1 restraining position. To disengage the pawl 14, the selector lever is removed from the Park position whereupon, through cable 44, rod 35, and retainer 40, a positive pull is exerted through the pin 34 on the actuator 22 which will shift it to the left and permit the spring 33 to urge the pawl 14 from the engaged position.

Because of certain extreme conditions, for instance, when the vehicle is parked on an incline, a very substantial load may be exerted on the cam rollers 24 and 26 such that it is difficult to move the actuator 22 to the left and from the restraining position. Since a cable is preferably utilized for cost and simplicity purposes, there can be very little leverage afforded which may be inadequate. Consequently, the effort needed to be exerted by the driver on the selector lever to effect a disengagement may be considerable or possibly the required effort may be more than the driver is capable of rendering. For this reason auxiliary provision is made in the form of an expansible chamber motor, e.g., the servo motor denoted generally at 46. Servo motor 46 is attached to the transmission casing 16 in the vicinity of the pawl 14, as seen in FIGURE 1, and is utilized to relieve this load and permit easy movement of the actuator 22 to the left from the restraining position.

As best shown by FIGURE 2, the servo motor 46 includes a cylinder 48 slidably housing a plunger 50 which is biased by spring 52 into continuous engagement with an extension 54 on the pawl 14. The spring 52 exerts less bias than the spring 33, and therefore, does not interfere with the disengaging function of the spring 33.

Fluid pressure for operating the servo motor 46 is derived from the vehicle wheel brake system which is designated generally at 56 in FIGURE 2. The brake system 56 is of the customary type employing a master cylinder 58 which, when a brake pedal 60 is depressed, transfers fluid pressure via a delivery conduit 62 to the mechanisms for engaging the wheel brakes.

In communication with the conduit 62 is a branch conduit 64 extending to a control valve mechanism 66, which constitutes a part of the auxiliary part and which comprises a valve body 68 formed with a multi-stepped continuous bore extending therethrough, the right end of which receives a cup-shaped sleeve 70. Sleeve 70 has a center opening 72 and a side opening 74 aligned with a port connected with the branch conduit 64. Housed inside the cup-shaped sleeve 70 is a tubular guide 76 arranged to slidably receive a supply valve rod 78. Situated so as to be axially aligned with the center opening 72 in the sleeve 70 are a pair of wiper seals 80 and 82 held apart by spring 84 and so positioned as to allow the supply valve rod 78 to pass therethrough. The spring 84 additionally urges the tubular guide 76 against a snap ring 86 supported in the sleeve 70.

Mounted in the left side of the bore in the valve body 68 and similar to the cup-shaped sleeve 70 is another cup-shaped sleeve 88 also provided with a side opening at 90 in communication with a return conduit 91 extending to the reservoir for the master cylinder 58 and a center opening 92. A tubular guide 94 slidably receives an exhaust valve rod 96 and axially aligns the valve rod 96 with the center opening 92 in the sleeve 88. A wiper seal 98 is held in place on the exhaust valve rod 96 and against the inside end of the tubular guide 94 by a spring 100. Spring 100 also holds the guide 94 against a snap ring 101 retained by the sleeve 88.

A chamber 102 is provided between the two sleeves 70 and 88 in which is situated a spring 104, which both holds a wiper seal 106 in position in the inside end of sleeve 88 and urges the sleeves 70 and 88, respectively, against snap rings 108 and 110. Chamber 102 communicates with a supply conduit 112 extending to the servo motor 46.

Opening and closing movements of the supply and exhaust valve rods 78 and 96 is coordinated through a follower device indicated generally at 114, which is provided with an elongated rod 116 in parallel alignment with the axis of the bore in the valve body 68. An arm 118 at one end is attached to the right side of the rod 116 while the other end of the arm 118 is affixed to a holder 120 which, in turn, is joined to and supports the supply valve rod 78. Secured to the left side of the rod 116 is an arm 122, similar to arm 118, and like the arm 118 is joined to a holder 124 which fixedly supports the exhaust valve rod 96. The follower device 114 is shifted back and forth by a transfer lever 126 or the equivalent, pivoted at 128 which preferably moves with the transmission selector lever. This may be accomplished by attaching to the medial portion of lever 126 a stud 130 and securing the cable 44 to this stud 130.

To engage the pawl 14, the transfer lever 126 is revolved counterclockwise, as depicted in FIGURE 2, by maneuvering the cable 44 and the follower device 114 will be shifted to the solid line setting in which the supply and exhaust valve rods 78 and 96 assume the viewed positions due to the engagement of the device holder 124 with lever 126. Then, when the brake pedal 60 is depressed, fluid pressure will be transferred by branch conduit 64 through side opening 74 and center opening 72 in the cup-shaped sleeve 70 to the chamber 102. Since the exhaust valve rod 96 is in the closed position, the fluid pressure in the chamber 102 will be delivered by the conduit 112 to the servo motor 46. This fluid pressure will force the plunger 50 upwardly, and accordingly, pivot the pawl 14 sufficiently to relieve the load on the rollers 24 and 26 and permit the actuator 22 to be easily removed from the FIGURE 1 restraining position.

As the cable 44 is pulled to remove the actuator 22 from the FIGURE 1 position, the transfer lever 126 will now be rotated clockwise whereupon a spring 132 becomes effective to shift the follower device 114 to the left and move the supply and exhaust valve rods 78 and 96 to their respective dotted line positions. The supply valve rod 78, therefore, will be in the center opening 72 and cutting off communication between the chamber 102 and the branch conduit 64. Exhaust valve rod 96 will be removed from the center opening 92, and consequently, the chamber 102 and supply line 112 to the servo motor 46 will be drained through side opening 90 and return the conduit 91 to the reservoir for the master cylinder 58.

To summarize the sequence of operation, consider first the events when the pawl 14 is engaged by moving the selector lever to the Park setting as has been described. In so doing, the servomotor 46 is prepared for operation, this being due to the actuation of the control valve mechanism 66 through the agency of the follower device 114, which has an operative connection with and is moved by the transfer lever 126 in opposition to the bias from spring 132 when the cable 44 is maneuvered by the selector lever. This actuation of the control valve mechanism 66 causes the exhaust valve rod 96 to be in the closed position and the supply valve rod 78 the open position so that communication between the vehicle brake system 56 and the servomotor 46 is permitted.

Now when the operator wishes to remove the selector lever from the Park setting and disengage the pawl 14, his first act is to depress the brake pedal 60. Because of the prior preparation of the servomotor 46, pressure fluid from the system 56 will cause pressure fluid actuation of the pawl 14 upwardly as viewed in FIGURE 1 and thereby permit easy effortless movement of the actuator 22 to pawl disengaged position by cable 44. As the cable 44 is so moved, the transfer lever 126 is revolved clockwise thereby from the FIGURE 2 position and this enables the spring 132, due to the removal of the compressive force exerted by lever 126, to return the follower device 114 to the dotted line FIGURE 2 position in which the supply valve rod 78 interrupts communication between the servomotor 46 and the vehicle brake system 56, and the exhaust valve rod 96 permits the servomotor 46 to be relieved of pressure fluid. The relief of servomotor 46 allows the spring 33 to withdraw the pawl 14 from engagement with the locking gear 12.

From the foregoing, it can be seen that with the parking brake engaged the driver may depress the brake pedal 60 which will relieve the actuator 22 of any excessive loads which the driver would otherwise be required to overcome. Therefore, a simple cable can be used to remove the actuator 22 from the restraining position with a minimum of effort. Consequently, there is considerable savings from the omission of the multiple links and levers normally needed, and furthermore, manufacturing tolerances have little influence on the operation of the parking brake.

The invention is to be limited only by the following claims.

What is claimed is:

1. In a brake mechanism, the combination of a rotatable locking member, a locking element movable to and from an engaged position relative to the locking member, the locking element being adapted in the engaged position to prevent rotation of the locking member, actuator means for moving the locking element to the engaged position and operative in a restraining position thereof to maintain the locking element in the engaged position and thereby resist a disengaging force urging the locking element from the engaged position, means connected to the actuator means for maneuvering the actuator means to and from the restraining position, and auxiliary means coacting with the locking element to cause the locking element to be maneuvered so as to tend to urge the locking element towards the engaged position to relieve the actuator means from the disengaging force acting on the locking element and thereby permit removal thereof from the restraining position by the maneuvering means.

2. In a brake mechanism, the combination of a rotatable locking member, a locking element movable to and from an engaged position relative to the locking member, the locking element being adapted in the engaged position to prevent rotation of the locking member, actuator means for moving the locking element to the engaged position, the actuator means being operative in a restraining position thereof to oppose disengaging forces acting on the locking element so as to maintain the locking element in the engaged position, means connected to the actuator means for maneuvering the actuator means to and from the restraining position, and auxiliary means coacting with the locking element to cause the locking element to be maneuvered so as to tend to urge the locking element towards the engaged position to relieve the actuator means of the load imposed thereon from the disengaging forces acting on the locking element thereby freeing the actuator means for removal from the restraining position by the maneuvering means.

3. In a parking brake mechanism for a vehicle having wheel brakes, the combination of a rotatable member drive connected to the vehicle wheels, a locking member connected to the rotatable member, a locking element movable to and from an engaged position relative to the locking member, the locking element being adapted in the engaged position to prevent rotation of the rotatable member, actuator means for moving the locking element to the engaged position, the actuator means being operative in a restraining position thereof to oppose disengaging forces acting on the locking element so as to maintain the locking element in the engaged position, means connected to the actuator means for maneuvering the actuator means to and from the restraining position, and auxiliary means coacting with the locking element and the wheel brakes so as to be rendered effective when the wheel brakes are operated to tend to urge the locking element towards the engaged position to relieve the actuator means of the load from the disengaging forces acting on the locking element thereby freeing the actuator means for removal from the restraining position by the maneuvering means.

4. In a parking brake mechanism for a vehicle having wheel brakes of a character that are operated by a fluid pressure system, the combination of a rotatable member drive connected to the vehicle wheels, a locking member connected to the rotatable member, a locking element movable to and from an engaged position relative to the locking member, the locking element being adapted in the engaged position to prevent rotation of the rotatable member, manually controlled means operative in a restraining position thereof to oppose disengaging forces acting on the locking element so as to maintain the locking element in the engaged position, and auxiliary means including an expansible chamber motor engageable with the locking element so as to relieve the manually controlled means of the load from the disengaging forces acting on the locking element thereby freeing the manually controlled means for removal from the restraining position and control valve mechanism interposed between the fluid pressure system and the motor, the control valve mechanism being operatively connected to the manually controlled means and so arranged as to connect the expansible chamber motor to the wheel brake fluid pressure system when the manually controlled means is in the restraining position thereby rendering the expansible chamber motor effective when the wheel brakes are operated.

5. In a parking brake mechanism, for a vehicle having wheel brakes of a character that are operated by a fluid pressure system, the combination of a rotatable member drive connected to the vehicle wheels, a toothed locking member connected to the rotatable member, a toothed locking element movable to and from an engaged position relative to the locking member so as to prevent rotation of the rotatable member, a manually controlled actuator movable to and from a restraining position in which the disengaging forces acting on the locking element are opposed so as to maintain the locking element in the engaged position, and auxiliary means including a servo motor for urging the locking element towards the engaged position and a control valve mechanism interposed between the fluid pressure system and the servo motor, the control valve mechanism being operatively connected to the actuator and so arranged that when the actuator is in the restraining position and the wheel brakes are operated fluid pressure is supplied to the servo motor causing the servo motor to relieve the actuator of the load from the disengaging forces acting on the locking element thereby freeing the actuator for removal from the restraining position.

6. In a parking brake mechanism for a vehicle having wheel brakes of a character that are operated by a fluid pressure system, the combination of a rotatable member drive connected to the vehicle wheels, a toothed locking member connected to the rotatable member, a toothed locking element movable to and from an engaged position relative to the locking member so as to prevent rotation of the rotatable member, an abutment, a manually controlled actuator movable to and from a restraining positon between the abutment and locking element so as to oppose disengaging forces acting on the locking element and maintain the locking element in the engaged position, a servo motor rendered effective when fluid pressure is delivered thereto to urge the locking element towards the engaged position and relieve the actuator of the load from disengaging forces acting on the locking element thereby freeing the actuator for easy removal from the restraining position, and a control valve mechanism interposed between the wheel brake fluid pressure system and the servo motor and having first and second settings, the control valve mechanism having an operative connection with the actuator so as to be placed in the first and second settings when the actuator is moved respectively to and from the restraining position, the control valve mechanism also including supply and exhaust valves and being so arranged that in the first setting thereof the supply valve is opened and the exhaust valve closed and in the second setting thereof the supply valve is closed and the exhaust valve is opened, the servo motor being supplied fluid pressure when the control valve mechanism is in the first setting and the wheel brakes are operated and relieved of fluid pressure when the valve mechanism is in the second setting.

7. In a transmission parking brake mechanism for a vehicle having wheel brakes of a character that are operated by a fluid pressure system, the combination of a transmission output shaft drive connected to the vehicle wheels, a locking gear connected to the output shaft, a toothed pawl provided with a cam surface thereon, the pawl being movable to and from an engaged position relative to the locking gear so as to prevent rotation of the output shaft, an abutment, an actuator for the pawl including a first roller journalled on the actuator and adapted to engage the cam surface on the pawl and a second roller journalled on the actuator and adapted to support the actuator on the abutment, means both for yieldably moving the actuator along the abutment towards a restraining position so as to oppose disengaging forces acting on the pawl and maintain the pawl in the engaged position and for positively removing the actuator from the restraining position so as to permit the pawl to be removed from the engaged position, biasing means for urging the pawl from the engaged position, a servo motor rendered effective when fluid pressure is delivered thereto to urge the pawl towards the engaged position and relieve the actuator of the disengaging forces acting on the pawl and permit the actuator to be removed from the restraining position, and a control valve mechanism interposed between the wheel brake fluid pressure system and the servo motor and having first and second settings, the control valve mechanism having an operative connection with the actuator so as to be placed in the first and second settings when the actuator is moved respectively to and from the restraining position, the control valve mechanism also including supply and exhaust valves and being so arranged that in the first setting thereof the supply valve is opened and the exhaust valve closed and in the second setting thereof the supply valve is closed and the exhaust valve opened, the servo motor being supplied fluid pressure when the control valve mechanism is in the first setting and the wheel brakes are operated and relieved of fluid pressure when the valve mechanism is in the second setting.

8. In a transmission parking brake mechanism for a vehicle having wheel brakes of a character that are operated by a fluid pressure system, the combination of a transmission output shaft drive connected to the vehicle wheels, a locking gear connected to the output shaft, a toothed pawl provided with a cam surface thereon, the pawl being movable to and from an engaged position relative to the locking gear so as to prevent rotation of the output shaft, an abutment, an actuator for the pawl including a first roller journalled on the actuator and adapted to engage the cam surface on the pawl and a second roller journalled on the actuator and adapted to support the actuator on the abutment, means both for yieldably moving the actuator along the abutment towards a restraining position so as to oppose disengaging forces acting on the pawl and maintain the pawl in the engaged position and for positively removing the actuator from the restraining position so as to permit the pawl to be removed from the engaged position, biasing means for urging the pawl from the engaged position, a servo motor rendered effective when fluid pressure is delivered thereto to urge the pawl towards the engaged position and relieve the actuator of the disengaging forces acting on the pawl and permit the actuator to be removed from the restraining position, a control valve mechanism interposed between the wheel brake fluid pressure system and the servo motor, the control valve mechanism having first and second settings and including supply and exhaust valves, and follower means having an operative connection with the actuator so as to cause the control valve mechanism to be placed in the first and second settings when the actuator is moved respectively to and from the restraining position thereby correlating the opening and closing of the supply and exhaust valves with movements of the actuator, the control valve mechanism being so arranged that in the first setting thereof the supply valve is opened and the exhaust valve closed and in the second setting thereof the supply valve is closed and the exhaust valve opened, the servo motor being supplied fluid pressure when the control valve mechanism is in the first setting and the wheel brakes operated and relieved of fluid pressure when the valve mechanism is in the second setting.

9. In a parking brake mechanism for a vehicle having wheel brakes of a character that are operated by a fluid pressure system, the combination of a rotatable locking member drive connected to the vehicle wheels, a locking element movable to and from an engaged position relative to the locking member so as to prevent rotation thereof, actuating means maneuverable to and from a restraining position in which the disengaging forces acting on the locking element are opposed so as to maintain the locking element in the engaged position, and auxiliary means including a servomotor for urging the locking element toward the engaged position and a control valve mechanism controlling the supply of fluid pressure to the servomotor from the fluid pressure system, the control valve mechanism being operatively connected to the actuating means so that when the actuating means is maneuvered, respectively, to and from the restraining position the control valve mechanism is positioned in the first setting thereof in which communication between the fluid pressure system and the servomotor is permitted and in the second setting thereof in which communication between the fluid pressure system and the servomotor is interrupted, the servomotor being supplied fluid pressure when the control valve mechanism is in the first setting and the wheel brakes are operated and relieved of fluid pressure when the valve mechanism is in the second setting.

10. In a brake mechanism, the combination of a rotatable locking member, a locking element movable to and from an engaged position relative to the locking member, the locking element being adapted in the engaged position to prevent rotation of the locking member, actuator means for moving the locking element to the engaged position and operative in a restraining position thereof to maintain the locking element in the engaged position and thereby resist a disengaging force urging the locking element from the engaged position, means connected to the actuator means for maneuvering the actuator means to and from the restraining position, and auxiliary means operatively connected to the actuator means, the auxiliary means coacting with the locking element to tend to urge the locking element towards the engaged position when the actuator means is in the restraining position to relieve the actuator means from the disengaging force imposed thereon by the locking element and thereby facilitate removal of the actuator means from the restraining position by the maneuvering means.

11. In a brake mechanism, the combination of a rotatable locking member, a locking element movable to and from an engaged position relative to the locking member, the locking element preventing in the engaged position the rotation of the locking member, actuator means for moving the locking element to the engaged position and operative in a restraining position thereof to oppose disengaging forces acting on the locking element so as to maintain the locking element in the engaged position, means connected to the actuator means for maneuvering the actuator to and from the restraining position and auxiliary means operatively connected to the actuator means, the auxiliary means coacting with the locking element to tend to urge the locking element towards the engaged position when the actuator means is in the restraining position so as to relieve the actuator means from the load imposed thereon from the disengaging forces acting on the locking element thereby freeing the actuator means for the removal of the restraining position by the maneuvering means.

12. In a parking brake mechanism for a vehicle having wheel brakes, the combination of a rotatable member drive connected to the vehicle wheels, a locking element movable to and from an engaged position relative to the rotatable member, the locking element preventing in the engaged position the rotation of the rotatable member, actuator means for moving the locking element to the engaged position and operative in a restraining position thereof to oppose disengaging forces acting on the locking element so as to maintain the locking element in the engaged position, means connected to the actuator means for maneuvering the actuator to and from the restraining position and auxiliary means coacting with the locking element and the vehicle brakes, the auxiliary means being rendered effective when the wheel brakes are operated and the actuator means is in a restraining position to tend to urge the locking element towards the engaged position so as to relieve the actuator means from the load from the disengaging force acting on the locking element thereby facilitating the removal of the actuator means from the restraining position by the maneuvering means.

References Cited in the file of this patent

UNITED STATES PATENTS

| 2,306,739 | Maier | Dec. 29, 1942 |
| 2,797,780 | Wemp | Jan. 4, 1951 |
| 2,821,275 | Martin | Jan. 28, 1958 |
| 2,841,251 | Shelton | July 1, 1958 |
| 2,860,731 | Hause | Nov. 18, 1958 |
| 2,875,856 | Mrlik et al. | Mar. 3, 1959 |
| 2,912,085 | De Lorean | Nov. 10, 1959 |